April 22, 1952 M. CLAUSEN 2,593,848
FLAP VALVE AUTOMATICALLY GUIDED BY A FEELING MEMBER
Filed Feb. 12, 1947
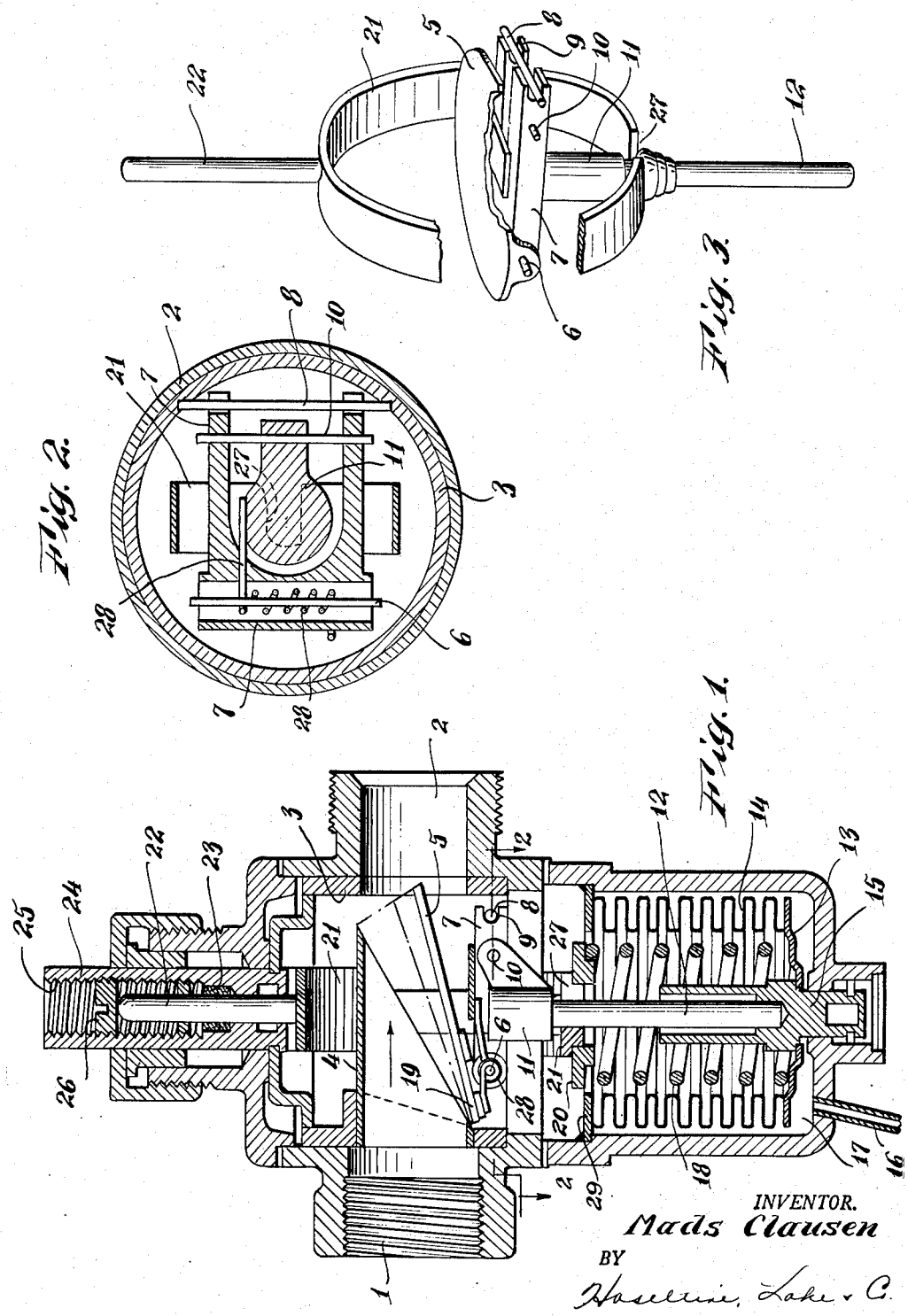
INVENTOR.
Mads Clausen
BY
AGENTS.

Patented Apr. 22, 1952

2,593,848

UNITED STATES PATENT OFFICE 2,593,848

FLAP VALVE AUTOMATICALLY GUIDED BY A FEELING MEMBER

Mads Clausen, Nordborg, Denmark

Application February 12, 1947, Serial No. 727,998
In Denmark May 29, 1946

6 Claims. (Cl. 251—125)

The invention relates to a flap valve of the kind which is automatically guided by a feeling member, and which is especially used in radiators in central heating plants.

In the art the known valves are provided with a cock plug or a usual conical valve body with its appropriate seat, which, however, will induce unnecessary resistances to the flow of the water in the plant.

On planning such plants, especially such plants as work with circulation by force of gravity, great significance, as will be known, is attached to the avoidance of such resistances as are not strictly necessary, and to the reduction, as far as possible, of inevitable resistances, whereby the reduction of the heating capacity of the plant is minimized.

The present invention relates to an automatically guided flap valve, by which the demand for the minimum resistance to the flow is satisfied as well as possible, the valve mechanism according to the invention being provided with a flap, which is able to tilt on its rear end relatively to the direction of flow as shown by the arrow, and which constantly is kept loosely pressed against the valve seat, which is made elliptical by the oblique cutting off of a pipe, which passes through the interior of the valve in known manner and is aligned with the inlet connecting branch and the outlet connecting branch of the valve. In this way the water in the plant will pass along a practically straight course of flow across the valve from the inlet connecting branch to the outlet connecting branch, and the minimum turbulence at the ordinary velocities of flow in such plants is achieved.

A particularly good control of the flow of water through the valve, with a view to securing a straight flow through the latter, is achieved by cutting off the pipe so obliquely according to the invention that the elliptic seat extends from a point close to the inlet connecting branch to a point close to the outlet connecting branch. Further the minimum turbulence is achieved by placing the valve body in such manner according to the invention that, on the opening of the valve, the valve body will turn towards a position parallel to the direction of flow.

Seeing that thermostatically controlled valve actuating members, as a rule, make a very short travel, rather a considerable multiplication of movement must be obtained in transmitting the motion to the rotatable flap of the valve, which flap is to make a movement which is relatively big compared to that of the actuating member, and to achieve a safe and simple transmission of this motion the tilting flap according to the invention can be rotatably placed on a lever, which is actuated by the actuating member and rotatable on a fixed axis.

The pivot point of the flap may with particular advantage be placed close to a plane passed through the axis of rotation of the lever and the momentary location in space of the axis of rotation of the flap, and preferably in such a way that the pivot point actually coincides with said plane when the flap is in mid-position between fully open and fully closed position, for in this way the rear end of the flap relatively to the direction of flow will be displaced to the smallest extent possible in the lengthwise direction of the flap during movement of the flap.

The valve in question can be arranged in such a manner that the whole of the valve mechanism can be removed for inspection or repair, those of its components which are placed in the valve housing being mutually and coheringly linked together, with the result that they can be removed from and inserted into the valve housing as a unit. This is particularly important where the inlet and outlet connecting branches can be blocked so that removal of the valve does not necessitate draining off the plant of its water content.

For reasons of design it will, as a rule, be difficult to obtain sufficient space at that end of the valve where a control member is inserted for a mechanism for the adjustment to the room temperature at which it is desired that the valve should open and close, and that is why the invention also includes a clamp, which fits around the pipe and the valve mechanism, for the transmission of an adjustment motion from an adjusting member built into a regulating handle, for instance a slotted screw for a spring regulating the effect of the control. Thus, on varying the pressure of the spring by turning the slotted screw, the exact temperature at which the effect of the actuating member will overcome the resistance of a spring will be changed, i. e. the temperature at which the valve will admit and shut off the flow of water.

In the drawing, Fig. 1 is a sectional elevation through a valve according to the invention, Fig. 2 is a cross-sectional view of some of the parts on line 2—2 of Fig. 1, and Fig. 3 is a partial view in perspective of some of the parts seen in Figs. 1 and 2.

The valve is intended to be placed in the inlet pipe of a radiator in a hot water circulating plant. The water flows into the valve through a connecting branch 1 and out through an outlet connecting branch 2, which is aligned with the connecting branch 1. A cylindrical bushing 3, rotatable on a vertical axis, is embedded in the housing of the valve, in which bushing a pipe 4, which is in vertical alignment with the connecting branches 1 and 2, is fixed. The said pipe 4 is obliquely cut off at its inner end to provide an elliptical seat, and the latter can be closed by a tilting flap 5, which is suspended so as to be able to rotate round a pivot 6 on a level 7, which itself is rotatable round a pivot 8, which is placed in a couple of recesses 9 in the lever 7. A spiral spring 28, fitting around the pivot 6, tends to open the flap 5.

The said lever 7 is rotatably connected by a pivot 10 with a shoe 11 on a spindle 12, movable in lengthwise direction, the lower end of which spindle is fixed in a bushing 15, which is connected with a plate 13, to which metal bellows 14 are fixed, the other end of the bellows abutting against a transverse wall 29.

Upon an increase of room temperature the pressure in the bellows chamber 17 will rise on the admission of control liquid from a control member, which is not shown, through a capillary tubing 16 into the bellows chamber 17, whereby the bellows 14 will tend to become compressed. However, such compression will not occur until the pressure has become sufficient to overcome the resistance of a spring 18 pressing against the plate 13. The bushing 15 and the spindle 12 are thereby raised, and the lever 7 and the flap 5 are turned upwards, until the latter closes the oblique opening of the pipe 4. Conversely, upon a decrease in room temperature a movement in the opposite direction will open the valve. Since the flap 5, during its movement, rotates round the pivot 6, the flap cannot at the same time be hinged to the pipe 4 at its rear end 19, but in order that the rear end of the flap may be displaced the smallest extent possible in the lengthwise direction of the flap during its movement, the pivot 6 is placed at such height that it lies in a horizontal plane through the axis of the pivot 8 and the rear end 19 when the flap 5 is in mid-position between fully open and fully closed position. In its fully open position the flap 5 is approximately horizontal so that the water can pass straight through the valve from the connecting branch 1 to the connecting branch 2.

The spring 18 rests at its top against a ring 20, against the upper side of which a clamp 21 presses; by raising and lowering the clamp the distortion of the spring 18 can be changed, and therefore the clamp 21 is provided with a spindle 22, which, through a packing 23, is inserted into a pipe 24 with internal thread 25, into which a slotted screw 26 is inserted.

By the turning of this screw with a screw driver the clamp 21 can then be raised and lowered, and in this way the distortion of the spiral spring 18 can be adjusted. Incidentally the pipe 24 can be made to end at the top in a usual radiator handle, and at the bottom it is connected with the bushing 3.

Thus by turning the handle the valve can be opened and closed without being dependent on the automaticity described, the bushing 3, by the turning of the handle, being put across the flow from the connecting branch 1 to the connecting branch 2, whereby the inlet as well as the outlet of the valve is blocked.

When the bushing is in this blocking position, the valve can be taken to pieces, and so the whole of the moving parts of the valve mechanism can be removed for overhaul. In that case the bellows chamber 17, the bellows 14, the spring 18, and its ring 20, are removed first, whereby the spindle 12 is laid bare; then the pivot 8 is taken out of the recesses 9, and the spindle 12 is likewise removed sideways from a recess 27 in the clamp 21, after which the whole of the moving parts of the valve mechanism can be removed as a unit.

In this way it has been made possible to repair a radiator valve without any need for dismounting it, which would necessitate draining off the water contained in the central heating plant.

Having now described my invention, what I claim as new and desire to secure by Letters Patent is:

1. A thermostatically controlled valve for controlling the flow of a liquid through a tube comprising a housing having diametrically opposed and axially aligned inlet and outlet openings therein, a rotatable bushing in said housing having diametrically opposed openings axially alignable with the housing openings, a tubular valve member carried by said bushing having its bore aligned with said inlet and outlet openings, said member having one end obliquely cut off to form an elliptical valve seat and the other end projecting into and secured to the wall of one of the bushing openings, a lever pivoted to said bushing on an axis transverse thereto, a flap valve pivotally connected to said lever on an axis parallel to said transverse axis at a point spaced from the rear end of said flap valve relatively to the direction of flow of the liquid through the tube, resilient means tending to maintain said valve in open position, movable actuating means in said housing adapted to move said lever and thereby to move said flap from open to closed position, and means in said housing connected to said actuating means and movable in response to changes of fluid pressure within said housing.

2. A device as claimed in claim 1 wherein said flap valve is arranged so that its rear end is always in contact with one edge of said tubular valve member.

3. A device as claimed in claim 1 wherein the major axis of the elliptical valve seat extends from a point adjacently said inlet pipe to a point adjacent the said outlet pipe.

4. A device as claimed in claim 1 wherein the flap valve is pivoted to said lever at a point substantially in a plane passing through the pivot axis of said lever to the bushing and the momentary axis of rotation of said flap valve when the flap is in mid-position between open and closed position.

5. A device as claimed in claim 1 wherein said movable actuating means includes a collar pivotally connected to said lever and is secured at its lower end in a bushing having a plate rigidly connected thereto, a bellows device being supported between said plate and a transverse partition in said housing, a spring opposing the movement of said plate and actuating means in the closing direction of said flap, and means for admitting fluid to said housing to exert pressure on said plate and cause compression of said bellows against the action of said spring thereby to effect vertical movement of said actuating means to close said flap valve.

6. A device as claimed in claim 5 having means for adjusting the pressure of said spring.

MADS CLAUSEN.

REFERENCES CITED

The following references are of record in the file of this patent:

UNITED STATES PATENTS

| Number | Name | Date |
|---|---|---|
| 534,029 | Ball | Feb. 12, 1895 |
| 713,331 | McClelland | Nov. 11, 1902 |
| 1,006,108 | Lundberg | Oct. 17, 1911 |
| 1,175,328 | Wright | Mar. 14, 1916 |
| 1,916,635 | Pepper | July 4, 1933 |
| 2,139,899 | LeBus | Dec. 13, 1938 |
| 2,151,098 | Greenwood | Mar. 21, 1939 |
| 2,222,710 | Goldschmidt | Nov. 26, 1940 |

FOREIGN PATENTS

| Number | Country | Date |
|---|---|---|
| 9,862 | Great Britain | of 1885 |